(12) United States Patent
Ahn et al.

(10) Patent No.: US 12,068,456 B2
(45) Date of Patent: Aug. 20, 2024

(54) LITHIUM SECONDARY BATTERY WITH IMPROVED SAFETY

(71) Applicant: LG Energy Solution, Ltd., Seoul (KR)

(72) Inventors: Kyoung Ho Ahn, Daejeon (KR); Won Tae Lee, Daejeon (KR); Jun Hyeok Han, Daejeon (KR); Su Hyeon Ji, Daejeon (KR); Chul Haeng Lee, Daejeon (KR); Won Kyung Shin, Daejeon (KR); Young Ho Oh, Daejeon (KR); You Kyeong Jeong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/080,451

(22) Filed: Dec. 13, 2022

(65) Prior Publication Data

US 2023/0207878 A1    Jun. 29, 2023

(30) Foreign Application Priority Data

Dec. 24, 2021 (KR) .................. 10-2021-0186970

(51) Int. Cl.
| | |
|---|---|
| *H01M 10/0567* | (2010.01) |
| *H01M 4/02* | (2006.01) |
| *H01M 4/04* | (2006.01) |
| *H01M 4/36* | (2006.01) |
| *H01M 4/38* | (2006.01) |
| *H01M 4/485* | (2010.01) |
| *H01M 4/505* | (2010.01) |
| *H01M 4/525* | (2010.01) |
| *H01M 4/583* | (2010.01) |
| *H01M 10/0568* | (2010.01) |

(Continued)

(52) U.S. Cl.
CPC ..... *H01M 10/0567* (2013.01); *H01M 4/0404* (2013.01); *H01M 4/364* (2013.01); *H01M 4/386* (2013.01); *H01M 4/485* (2013.01); *H01M 4/505* (2013.01); *H01M 4/525* (2013.01); *H01M 4/583* (2013.01); *H01M 10/0568* (2013.01); *H01M 10/0569* (2013.01); *H01M 50/46* (2021.01); *H01M 2004/027* (2013.01); *H01M 2004/028* (2013.01)

(58) Field of Classification Search
CPC ............ H01M 10/0567; H01M 50/46; H01M 4/0404; H01M 4/364; H01M 4/386; H01M 4/485; H01M 4/505; H01M 4/525; H01M 4/583; H01M 10/0568; H01M 10/0569; H01M 2004/027; H01M 2004/028

See application file for complete search history.

(56) References Cited

U.S. PATENT DOCUMENTS

| | | |
|---|---|---|
| 2007/0292764 A1 | 12/2007 | Soma et al. |
| 2011/0123871 A1 | 5/2011 | Nakagawa et al. |

(Continued)

FOREIGN PATENT DOCUMENTS

| | | |
|---|---|---|
| CN | 111224159 A | 6/2020 |
| CN | 113130984 A | 7/2021 |

(Continued)

OTHER PUBLICATIONS

Qi, X. et al., "Lifetime limit of tris(trimethylsilyl) phosphite as electrolyte additive for high voltage lithium ion batteries" RSC Advances, Apr. 2016, p. 38342-38349, vol. 6. Issue 44.

(Continued)

*Primary Examiner* — Cynthia H Kelly
*Assistant Examiner* — Niara Trant
(74) *Attorney, Agent, or Firm* — Lerner David LLP

(57) ABSTRACT

An electrolyte composition and a lithium secondary battery including the same are disclose herein. The electrolyte composition has improved high temperature safety. In some embodiments, the electrolyte composition includes an additive including a compound represented by Formula 1.

[Formula 1]

Each $R_1$ is independently a single bond, an alkylene group having 1 to 10 carbon atoms, or $$\text{\textemdash} R_3 \text{\textemdash} (OCH_2CH_2)_a \text{\textemdash},$$

each $R_2$ is independently a double or triple bond including 2 carbon atoms, each $R_3$ is independently hydrogen or an alkyl group having 1 to 4 carbon atoms, and $a$ is an integer of 1 to 10. The additive may reinforce an SEI layer on the surface of an electrode, thereby having advantages of (Continued)

improved storage and lifetime characteristics at a high temperature and a decreased amount of gas generated in the battery.

12 Claims, No Drawings

(51) Int. Cl.
  *H01M 10/0569* (2010.01)
  *H01M 50/46* (2021.01)

(56) References Cited

U.S. PATENT DOCUMENTS

| | | | |
|---|---|---|---|
| 2014/0079986 | A1 | 3/2014 | Eo et al. |
| 2016/0028111 | A1 | 1/2016 | Ahn et al. |
| 2020/0020972 | A1 | 1/2020 | Shi et al. |
| 2020/0161705 | A1 | 5/2020 | Seo et al. |
| 2022/0013810 | A1 | 1/2022 | Xiong et al. |

FOREIGN PATENT DOCUMENTS

| | | |
|---|---|---|
| JP | 2000123864 A | 4/2000 |
| KR | 20040099606 A | 12/2004 |
| KR | 20100120164 A | 11/2010 |
| KR | 10-2014-0038171 A | 3/2014 |
| KR | 20150050508 A | 5/2015 |
| KR | 101637090 B1 | 7/2016 |
| KR | 101683200 B1 | 12/2016 |
| KR | 20190110591 A | 9/2019 |
| KR | 20200056873 A | 5/2020 |

OTHER PUBLICATIONS

International Search Report for Application No. PCT/KR2022/019877 mailed Mar. 29, 2023, pp. 1-3. [See p. 2, categorizing the cited references].

LITHIUM SECONDARY BATTERY WITH IMPROVED SAFETY

CROSS-REFERENCE TO RELATED APPLICATIONS

This application claims priority from Korean Patent Application No. 10-2021-0186970, filed on Dec. 24, 2021, the disclosures of which are incorporated by reference herein.

TECHNICAL FIELD

The present disclosure relates to a lithium secondary battery with improved safety.

BACKGROUND

Recently, secondary batteries are widely applied not only to small devices such as portable electronic devices, but to medium and large devices such as battery packs or power storage devices of hybrid or electric vehicles. Examples of these secondary batteries may include non-aqueous electrolyte batteries such as lithium-ion batteries, lithium batteries, lithium-ion capacitors, and sodium ion batteries.

However, a non-aqueous electrolyte is applied in the form including a lithium salt, and $LiPF_6$, which is the most widely used lithium salt, reacts with an electrolyte solvent to promote the depletion of the solvent and generate HF. The HF generated thereby may not only generate a large amount of gas under a high temperature condition, but also elute metal ions from a positive electrode active material, and when the eluted metal ions are generated in the form of a precipitate on the surface of a negative electrode, it causes an increase in potential of a negative electrode and a cell open-circuit voltage (OCV) drop, leading to problems such as a reduction in lifespan and high-temperature safety.

Meanwhile, in a lithium secondary battery, a lithium metal oxide is used as a positive electrode active material, and a lithium metal, a lithium alloy, crystalline or amorphous carbon, or a carbon complex is used as a negative electrode active material. A secondary battery is manufactured by forming an electrode group by applying the active material on a current collector to have appropriate thickness and length or applying the active material in a film shape and winding or stacking with a separator which is an insulator, putting the resulting electrode group into a can or a similar container thereto, and injecting an electrolyte.

Such a lithium secondary battery is charged/discharged by repeating intercalation and deintercalation of lithium ions from the lithium metal oxide of a positive electrode into a graphite electrode as a negative electrode. Here, since lithium has strong reactivity, it reacts with a carbon electrode to generate $Li_2CO_3$, LiO, or LiOH, thereby forming a coating film on the surface of the negative electrode. This coating film is referred to as a solid electrolyte interface (SEI) film, and the SEI film formed at the beginning of charging prevents the reaction between lithium ions and the carbon negative electrode or other materials. In addition, the SEI film serves as an ion tunnel to pass only lithium ions. The ion tunnel allows solvation of lithium ions, so organic solvents of an electrolyte with a large molecular weight, which migrate together, are co-intercalated to block the collapse of the structure of the carbon negative electrode.

Therefore, to improve the high-temperature cycle characteristics of a lithium secondary battery, it is necessary to form a durable SEI film on the negative electrode of the lithium secondary battery. Once being formed in the initial charging, the SEI film prevents the reaction between the lithium ions and the negative electrode or other materials in the repeated charge/discharge by the use of the battery, and serves as an ion tunnel through which only lithium ions pass between the electrolyte and the negative electrode.

However, in the case of an electrolyte that does not include an electrolyte additive or includes an electrolyte additive having poor characteristics, it was difficult to expect the improvement of output characteristics due to the formation of the non-uniform SEI film. Furthermore, when the amount of the electrolyte including an electrolyte additive is not adjusted to the required amount, due to the electrolyte additive, there was a problem in that the surface of the positive electrode was decomposed during a high-temperature reaction or the oxidation reaction of the electrolyte ultimately causes an increase in irreversible capacity of the secondary battery increases and degradation of the output characteristics thereof.

Therefore, there is a demand for the development of a compound that can improve overall battery performance such as high-rate charge/discharge characteristics, high-temperature performance characteristics, and lifetime characteristics by forming a durable SEI coating film on a negative electrode and can be used as an electrolyte additive for reducing an amount of gas generated at a high temperature.

BRIEF SUMMARY

Technical Problem

Therefore, the present disclosure is directed to providing an electrolyte composition that forms a coating film on the surface of an electrode of the present disclosure, so high-rate charge/discharge characteristics of a lithium secondary battery can be enhanced, high-temperature storage characteristics and lifetime characteristics can be improved and an amount of gas generated can be reduced, and a lithium secondary battery including the same.

Technical Solution

To solve the above-described problem,
one embodiment of the present disclosure provides an electrolyte composition, which includes:
a non-aqueous organic solvent; a lithium salt; and an additive including a compound represented by Formula 1 below:

[Formula 1]

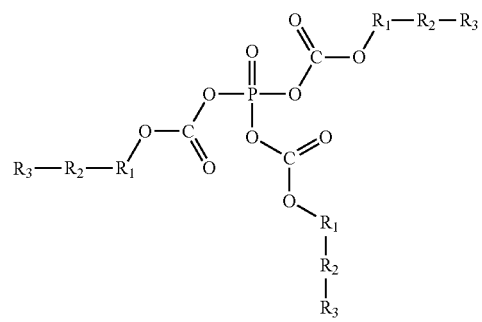

In Formula 1,
each $R_1$ is independently a single bond, an alkylene group having 1 to 10 carbon atoms, or

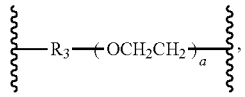

each $R_2$ is independently a double or triple bond including 2 carbon atoms,
each $R_3$ is independently hydrogen or an alkyl group having 1 to 4 carbon atoms, and
a is an integer of 1 to 10.

Specifically, each $R_1$ may be independently a single bond, a methylene group, an ethylene group, a propylene group, or

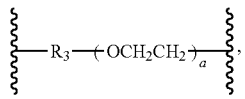

each $R_3$ may be independently hydrogen or a methyl group, and
a may be an integer of 1 to 5.

In one example, the compound represented by Formula 1 may include one or more compounds of Structural Formulas 1 to 8 below:

Structural Formula 1

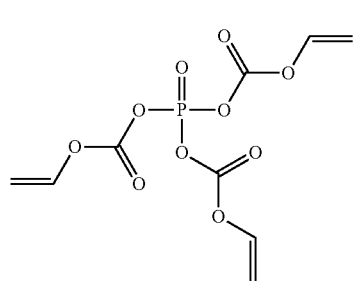

Structural Formula 2

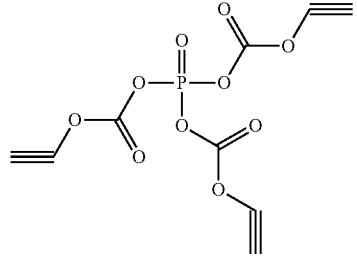

Structural Formula 3

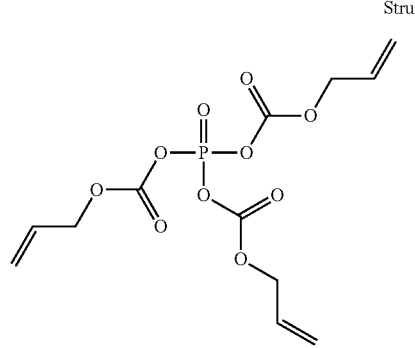

Structural Formula 4

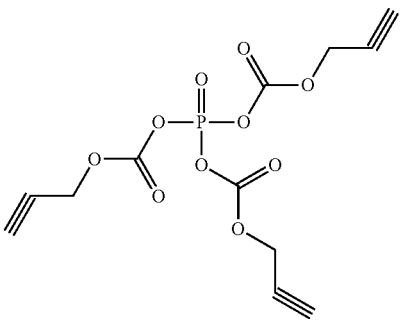

Structural Formula 5

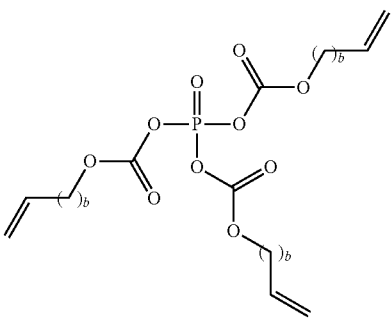

b = respectively 2 or 3

Structural Formula 6

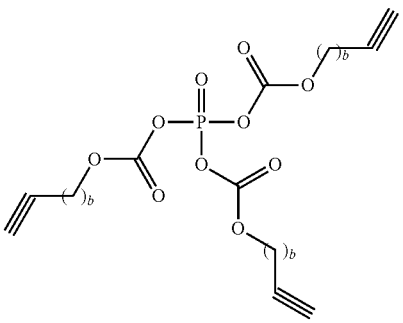

b = respectively 2 or 3

Structural Formula 7

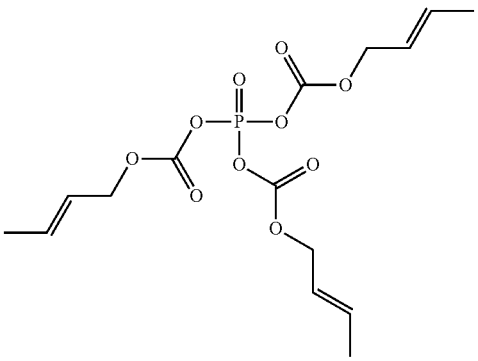

-continued

Structural Formula 8

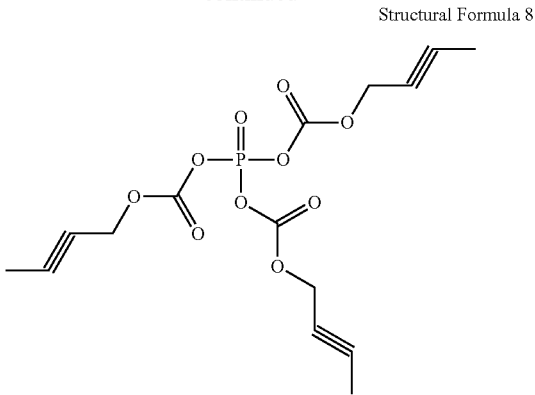

In addition, the additive may be present in an amount of 0.01 to 5 wt % with respect to the total weight of the electrolyte composition.

Moreover, the lithium salt may include one or more selected from the group consisting of LiCl, LiBr, LiI, LiClO$_4$, LiBF$_4$, LiB10Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, and (FSO$_2$)$_2$NLi.

In addition, the non-aqueous organic solvent may include one or more selected from the group consisting of N-methyl-2-pyrrolidinone, ethylene carbonate, propylene carbonate, butylene carbonate, dimethyl carbonate, diethyl carbonate, 7-butyrolactone, 1,2-dimethyoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl citrate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

Further, one embodiment of the present disclosure provides a lithium secondary battery, which includes:

an electrolyte assembly including a positive electrode, a negative electrode, and a separator interposed between the positive electrode and the negative electrode, and an electrolyte composition including a non-aqueous organic solvent, a lithium salt, and an additive including a compound represented by Formula 1 below.

[Formula 1]

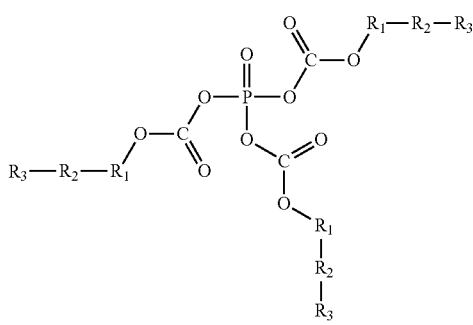

In Formula 1, each R$_1$ is independently a single bond, an alkylene group having 1 to 10 carbon atoms, or

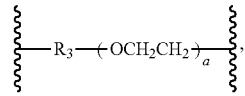

each R$_2$ is independently a double or triple bond including 2 carbon atoms, each R$_3$ is independently hydrogen or an alkyl group having 1 to 4 carbon atoms, and a is an integer of 1 to 10.

In addition, the positive electrode may include a positive electrode current collector, and a positive electrode mixture layer formed on the positive electrode current collector, wherein the positive electrode mixture layer contains one or more selected from the lithium metal oxides represented by Formulas 2 and 3 below:

$$Li_x[Ni_yCo_zMn_wM^1_v]O_2$$ [Formula 2]

$$LiM^2_pMn_{(2-p)}O_4$$ [Formula 3]

In Formulas 2 and 3,

M$^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, x, y, z, w and v are respectively $1.0 \leq x \leq 1.30$, $0.5 \leq y < 1$, $0 < z \leq 0.3$, $0 < w \leq 0.3$, and $0 \leq v \leq 0.1$, wherein $y+z+w+v=1$, M$^2$ is Ni, Co or Fe, and p is $0.05 \leq p \leq 0.6$.

In one example, the lithium metal oxide may include one or more selected from the group consisting of LiNi$_{0.8}$Co$_{0.1}$Mn$_{0.1}$O$_2$, LiNi$_{0.6}$Co$_{0.2}$Mn$_{0.2}$O$_2$, LiNi$_{0.9}$Co$_{0.05}$Mn$_{0.05}$O$_2$, LiNi$_{0.6}$Co$_{0.2}$Mn$_{0.1}$Al$_{0.1}$O$_2$, LiNi$_{0.6}$Co$_{0.2}$Mn$_{0.15}$Al$_{0.05}$O$_2$, LiNi$_{0.7}$Co$_{0.1}$Mn$_{0.1}$Al$_{0.1}$O$_2$, LiNi$_{0.7}$Mn$_{1.3}$O$_4$, LiNi$_{0.5}$Mn$_{1.5}$O$_4$, and LiNi$_{0.3}$Mn$_{1.7}$O$_4$.

In addition, the negative electrode may include a negative electrode current collector, and a mixture layer which is formed on the negative electrode current collector, wherein the mixture layer contains a negative electrode active material, and the negative electrode active material may include one or more carbon materials selected from the group consisting of natural graphite, artificial graphite, expanded graphite, non-graphitizing carbon, carbon black, acetylene black, and Ketjen black.

In addition, the negative electrode active material may further include one or more silicon materials selected from the group consisting of silicon (Si), silicon carbide (SiC) and silicon oxide (SiOq, $0.8 \leq q \leq 2.5$).

In this case, the silicon material may be present in an amount of 1 to 20 wt % with respect to the total weight of the negative electrode active material.

Advantageous Effects

Since an electrolyte composition according to the present disclosure includes an additive including a compound represented by Formula 1, it can reinforce an SEI layer on the surface of an electrode, thereby having advantages of improved storage and lifetime characteristics at a high temperature, and a decreased amount of gas generated in a battery.

DETAILED DESCRIPTION

The present disclosure may have various modifications and various examples, and thus specific examples are illustrated in the drawings and described in detail in the detailed description.

However, it should be understood that the present disclosure is not limited to specific embodiments, and includes all modifications, equivalents or alternatives within the spirit and technical scope of the present disclosure.

The terms "comprise," "include" and "have" used herein designate the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance.

In addition, when a part of a layer, film, region or plate is disposed "on" another part, this includes not only a case in which one part is disposed "directly on" another part, but a case in which a third part is interposed therebetween. In contrast, when a part of a layer, film, region or plate is disposed "under" another part, this includes not only a case in which one part is disposed "directly under" another part, but a case in which a third part is interposed therebetween. In addition, in this application, "on" may include not only a case of disposed on an upper part but also a case of disposed on a lower part.

In addition, in the present disclosure, the "included as a main component" may mean that a defined component is included at 50 wt % or more, 60 wt % or more, 70 wt % or more, 80 wt % or more, 90 wt % or more, or 95 wt % or more with respect to the total weight. For example, the "graphite is included as a main ingredient in a negative electrode active material" means that graphite is included at 50 wt % or more, 60 wt % or more, 70 wt % or more, 80 wt % or more, 90 wt % or more, or 95 wt % or more with respect to the total weight of the negative electrode active material, and in some cases, it means that a negative electrode active material totally consists of graphite and includes 100 wt % of graphite.

Hereinafter, the present disclosure will be described in further detail.

Electrolyte Composition

In one embodiment of the present disclosure, an electrolyte composition including a non-aqueous organic solvent; a lithium salt; and an additive including a compound represented by Formula 1 below is provided:

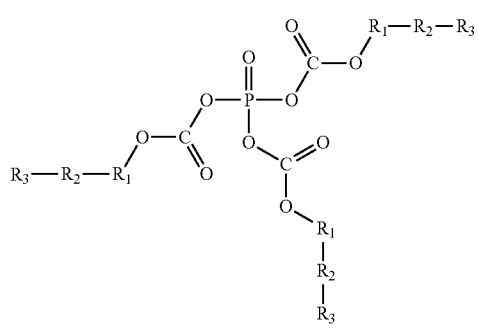

[Formula 1]

In Formula 1, each $R_1$ is independently a single bond, an alkylene group having 1 to 10 carbon atoms, or

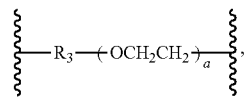

each $R_2$ is independently a double or triple bond including 2 carbon atoms, each $R_3$ is independently hydrogen or an alkyl group having 1 to 4 carbon atoms, and a is an integer of 1 to 10.

The electrolyte composition according to the present disclosure is a non-aqueous electrolyte composition containing a lithium salt, and includes the additive including the compound represented by Formula 1.

Here, the compound represented by Formula 1 has a structure in which an unsaturated hydrocarbon group such as a vinyl group or a propagyl group is introduced to an end at a phosphate, and includes, as a linker, a carbonate group having an oxygen atom of a phosphate between the phosphate group and the unsaturated hydrocarbon group. Accordingly, in the activation of a secondary battery, an organic and/or inorganic coating film(s) may be uniformly formed on the surface(s) of a positive electrode and/or a negative electrode. According to this, the electrolyte additive can inhibit the generation of gas caused by decomposition of the electrolyte when a battery is exposed to a high temperature, and can improve an increase in resistance and/or a decrease in capacity of the battery, resulting in further improvement in the performance and high-temperature safety of the battery.

To this end, in the compound represented by Formula 1, each $R_1$ is independently a single bond, a methylene group, an ethylene group, a propylene group, or

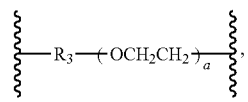

each $R_3$ is independently hydrogen or a methyl group, and a is an integer of 1 to 5.

In one example, the compound represented by Formula 1 may include one or more compounds of Structural Formulas 1 to 8 below:

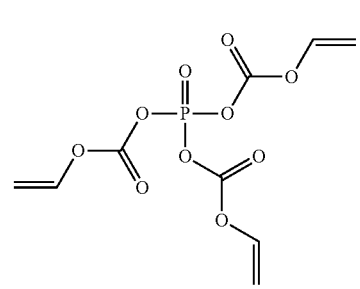

Structural Formula 1

Structural Formula 2

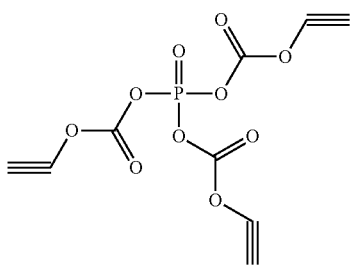

Structural Formula 6

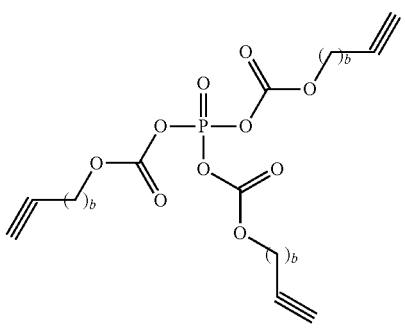

b = respectively 2 or 3

Structural Formula 3

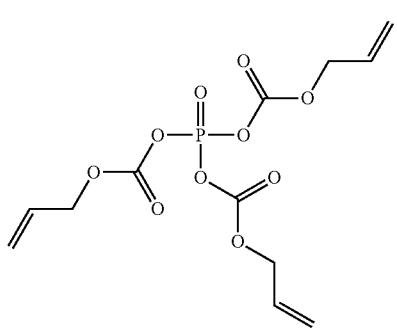

Structural Formula 7

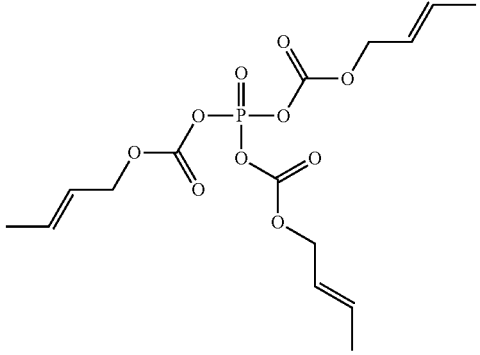

Structural Formula 4

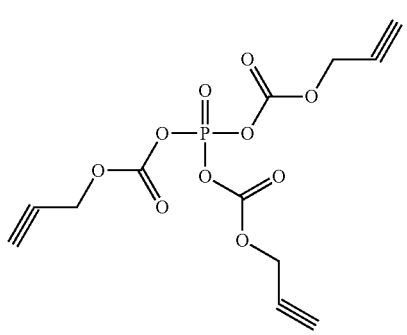

Structural Formula 8

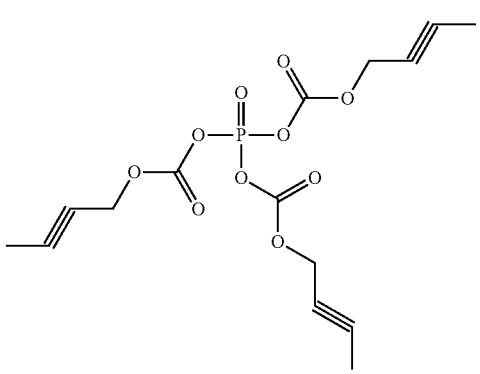

Structural Formula 5

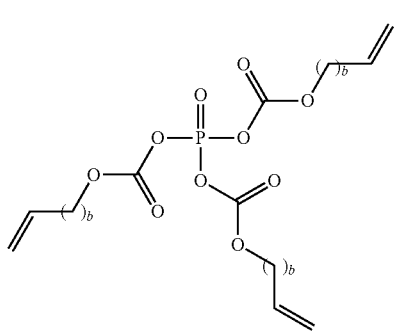

b = respectively 2 or 3

As the electrolyte composition according to the present disclosure includes one or more of the compounds of Structural Formulas 1 to 8 as an additive(s), it is possible to reduce the gas generated during the charging/discharging of a secondary battery and effectively prevent an increase in cell resistance and a decrease in capacity, which are caused by the elution of metal ions from an electrode, leading to further improvement in performance and high-temperature safety of the battery.

In addition, the additive including the compound represented by Formula 1 may be included at a certain content in the electrolyte composition. Specifically, the compound represented by Formula 1 may be present in an amount of 0.01 to 5 wt %, and more specifically, 0.05 to 5 wt %, 0.05 to 3 wt %, 0.1 to 2.5 wt %, or 0.5 to 1.5 wt % with respect to the total weight of the electrolyte composition. In the present disclosure, the content of the electrolyte additive is used in excess outside the above range to increase the viscosity of the electrolyte composition, thereby preventing the wettability of an electrode and a separator from being degraded, and preventing a limited charging/discharging capacity due to an increase in battery resistance and a decrease in recovery capacity after storage. In addition, the present disclosure may prevent the additive effect from being insignificantly implemented by using the first additive at a trace amount outside the above range.

Meanwhile, the lithium salt used in the electrolyte composition may be applied without particular limitation as long as it is used in a non-aqueous electrolyte in the art. Specifically, the lithium salt may include one or more selected from the group consisting of LiCl, LiBr, LiI, LiClO$_4$, LiBF$_4$, LiB10Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$Nli, and (FSO$_2$)$_2$NLi.

The concentration of the lithium salt is not particularly limited, and the lower limit of the appropriate concentration range is 0.5 mol/L or more, specifically 0.7 mol/L or more, and more specifically 0.9 mol/L or more, and the upper limit of the appropriate concentration range is 2.5 mol/L or less, specifically 2.0 mol/L or less, and more specifically 1.5 mol/L or less. When the concentration of the lithium salt is lower than 0.5 mol/L, there is a risk that ion conductivity is reduced, and the cycle characteristics and output characteristics of a non-aqueous electrolyte battery are lowered. In addition, when the concentration of the lithium salt exceeds 2.5 mol/L, the viscosity of an electrode for non-aqueous electrolyte battery increases, and thus there is a risk of decreasing ion conductivity and lowering the cycle characteristics and output characteristics of a non-aqueous electrolyte battery.

In addition, when a large amount of lithium salt is dissolved in a non-aqueous organic solvent at once, the liquid temperature may increase because of the dissolution heat for the lithium salt. As described above, when the temperature of the non-aqueous organic solvent significantly increases due to the dissolution heat for the lithium salt, there is a risk that the decomposition may be accelerated to generate hydrogen fluoride (HF). Hydrogen fluoride (HF) is not preferable because it causes deterioration in battery performance. Therefore, a temperature at which the lithium salt is dissolved in a non-aqueous organic solvent may be adjusted to −20 to 80° C., and specifically 0 to 60° C., but the present disclosure is not particularly limited thereto.

Furthermore, a non-aqueous organic solvent used in the electrolyte composition may be applied without particular limitation as long as it can be used in a non-aqueous electrolyte in the art. Specifically, examples of the non-aqueous organic solvents may include aprotic organic solvents such as N-methyl-2-pyrrolidinone, ethylene carbonate (EC), propylene carbonate, butylene carbonate, dimethyl carbonate, diethyl carbonate, 7-butyrolactone, 1,2-dimethyoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl citrate, phosphoric acid triester, trimethoxy methane, a dioxolane derivative, sulfolane, methyl sulfolane, 1,3-diethyl-2-imidazolidinone, a propylene carbonate derivative, a tetrahydrofuran derivative, ether, methyl propionate, and ethyl propionate.

In addition, as a non-aqueous solvent used in the present disclosure, one type of the above examples may be used alone, or two or more types thereof may be used by mixing in any combination and ratio according to the purpose. In terms of electrochemical stability against the oxidation/reduction of the solvent and chemical stability against heat or the reaction with a solute, among the above examples, particularly, propylene carbonate, ethylene carbonate, fluoroethylene carbonate, diethyl carbonate, dimethyl carbonate, or ethyl methyl carbonate is preferable.

Meanwhile, the electrolyte composition may further include an additive, other than the above-described basic components. Without departing the gist of the present disclosure, an additive generally used in the non-aqueous electrolyte of the present disclosure may be added at any ratio. Specifically, the additive may be a compound having an overcharge prevention effect, a negative electrode coating film-forming effect, and a positive electrode protection effect, such as cyclohexylbenzene, biphenyl, t-butylbenzene, vinylene carbonate, vinylethylene carbonate, difluoroanisole, fluoroethylene carbonate, propane sultone, succinonitrile, or dimethylvinylene carbonate. In addition, in the case of use in a non-aqueous electrolyte battery called a lithium polymer battery, it is possible to use an electrolyte for non-aqueous electrolyte batteries after being pseudo-solidified by a gelling agent or cross-linked polymer.

Lithium Secondary Battery

Further, one embodiment of the present disclosure provides a lithium secondary battery, which includes:

an electrolyte assembly including a positive electrode, a negative electrode, and a separator interposed between the positive electrode and the negative electrode, and an electrolyte composition including a non-aqueous organic solvent, a lithium salt, and an additive including a compound represented by Formula 1 below:

[Formula 1]

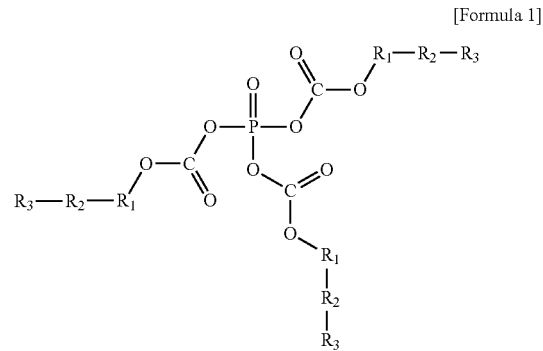

In Formula 1, each R$_1$ is independently a single bond, an alkylene group having 1 to 10 carbon atoms, or

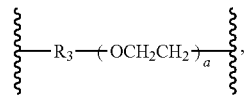

each R$_2$ is independently a double or triple bond including 2 carbon atoms, each R$_3$ is independently hydrogen or an alkyl group having 1 to 4 carbon atoms, and a is an integer of 1 to 10.

The lithium secondary battery according to the present disclosure has a configuration including an electrode assembly, which includes a positive electrode, a negative electrode and a separator interposed between the positive and negative electrodes, and the electrolyte composition of the present disclosure described above, and because of the electrolyte composition, an amount of gas generated during the charging/discharging of the battery decreases, and the lithium secondary battery exhibits excellent performance in terms of initial resistance and initial capacity, and has an excellent effect of improving battery performance and safety at a high temperature, particularly, when using a positive electrode active material including a high concentration of nickel and/or manganese.

Here, the positive electrode includes a positive electrode mixture layer formed by applying, drying and pressing a positive slurry including a positive electrode active material on a positive electrode current collector, and may further include selectively a conductive material, a binder, or other additives as needed.

Here, the positive electrode active material is a material that can cause an electrochemical reaction on the positive electrode current collector, and may include one or more of lithium metal oxides represented by Formulas 2 and 3 below, which enable the reversible intercalation and deintercalation of lithium ions:

$$Li_x[Ni_yCo_zMn_wM^1_v]O_2 \quad \text{[Formula 2]}$$

$$LiM^2_pMn_{(2-p)}O_4 \quad \text{[Formula 3]}$$

In Formulas 2 and 3, $M^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, x, y, z, w and v are respectively $1.0 \leq x \leq 1.30$, $0.5 \leq y < 1$, $0 < z \leq 0.3$, $0 < w \leq 0.3$, and $0 \leq v \leq 0.1$, wherein $y+z+w+v=1$, $M^2$ is Ni, Co or Fe, and p is $0.05 \leq p \leq 0.6$.

The lithium metal oxides represented by Formulas 2 and 3 are materials containing nickel (Ni) and manganese (Mn) at a high content, respectively, and have an advantage in which high capacity and/or high voltage of electricity can be stably supplied.

Here, the lithium metal oxides represented by Formula 2 may include $LiNi_{0.8}Co_{0.1}Mn_{0.1}O_2$, $LiNi_{0.6}Co_{0.2}Mn_{0.2}O_2$, $LiNi_{0.9}Co_{0.05}Mn_{0.05}O_2$, $LiNi_{0.6}Co_{0.2}Mn_{0.1}Al0.1O_2$, $LiNi_{0.6}Co_{0.2}Mn_{0.15}Al_{0.05}O_2$, and $LiNi_{0.7}Co_{0.1}Mn_{0.1}Al_{0.1}O_2$, and the lithium metal oxides represented by Formula 3 may include $LiNi_{0.7}Mn_{1.3}O_4$, $LiNi_{0.5}Mn_{1.5}O_4$ and $LiNi_{0.3}Mn_{1.7}O_4$, and these oxides may be used alone or in combination.

In addition, in the positive electrode, as a positive electrode current collector, a material that does not cause a chemical change in the corresponding battery and has high conductivity may be used. For example, stainless steel, aluminum, nickel, titanium, or calcined carbon may be used, and in the case of aluminum or stainless steel, one that is surface treated with carbon, nickel, titanium or silver may also be used. In addition, the average thickness of the current collector may be suitably selected within 3 to 500 μm in consideration of the conductivity and total thickness of the positive electrode to be formed.

In addition, the negative electrode, like the positive electrode, includes a negative electrode mixture layer formed by applying, drying and pressing a negative electrode active material on a negative electrode current collector, and may selectively further include a conductive material, a binder, or other additives as needed.

The negative electrode active material may include a carbon material. Specifically, the carbon material refers to a material that has a carbon atom as the main component, and examples of the carbon materials may include one or more selected from the group consisting of natural graphite, artificial graphite, expanded graphite, non-graphitizing carbon, carbon black, acetylene black, and Ketjen black.

In addition, the negative electrode active material may further include a silicon material, in addition to the carbon material. Here, the silicon material refers to a material that has a silicon atom as a main component, and may include silicon (Si), silicon carbide (SiC), silicon monoxide (SiO) or silicon dioxide ($SiO_2$) alone or in combination. When, as the silicon (Si)-containing materials, silicon monoxide (SiO) and silicon dioxide ($SiO_2$) are uniformly mixed or combined to be included in the negative electrode mixture layer, these materials may be represented as a silicon oxide (SiOq, $0.8 \leq q \leq 2.5$).

Moreover, the silicon material may be included at 1 to 20 wt %, and specifically, 3 to 10 wt %, 8 to 15 wt %, 13 to 18 wt %, or 2 to 8 wt % with respect to the total weight of the negative electrode active material. The present disclosure may maximize the energy density of the battery by controlling the content of the silicon material in the above content range.

In addition, the negative electrode current collector is not particularly limited as long as it has high conductivity without causing a chemical change in the battery, and for example, copper, stainless steel, nickel, titanium or calcined carbon may be used, and in the case of copper or stainless steel, one whose surface is treated with carbon, nickel, titanium or silver may be used. Furthermore, the average thickness of the negative electrode current collector may be suitably selected within 1 to 500 m in consideration of the conductivity and total thickness of the negative electrode to be formed.

Meanwhile, the separator interposed between the positive electrode and the negative electrode of each unit cell is an insulating thin film having high ion permeability and high mechanical strength, and is not particularly limited as long as it is one that is commonly used in the art. Specifically, the separator may include one or more polymers selected from chemical-resistant and hydrophobic polypropylene, polyethylene and a polyethylene-propylene copolymer. The separator may have the form of a porous polymer substrate, such as a sheet or non-woven fabric including the above-described polymer, and in some cases, have the form of a composite separator in which organic or inorganic particles on the porous polymer substrate are coated with an organic binder. In addition, the separator may have an average pore diameter of 0.01 to 10 μm, and an average thickness of 5 to 300 μm.

Further, the secondary battery includes the above-described non-aqueous electrolyte composition according to the present disclosure as an electrolyte.

The electrolyte composition includes an additive including a compound represented by Formula 1 below as an additive:

[Formula 1]

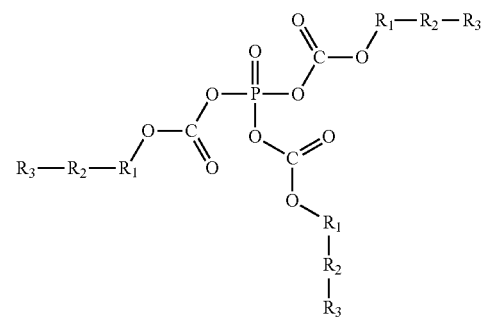

In Formula 1, each $R_1$ is independently a single bond, an alkylene group having 1 to 10 carbon atoms, or

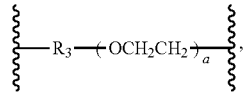

each $R_2$ is independently a double or triple bond including 2 carbon atoms, each $R_3$ is independently hydrogen or an alkyl group having 1 to 4 carbon atoms, and a is an integer of 1 to 10.

The compound represented by Formula 1 has a structure in which an unsaturated hydrocarbon group such as a vinyl group or a propagyl group is introduced to an end at a phosphate, and includes, as a linker, a carbonate group having an oxygen atom of a phosphate between the phosphate group and the unsaturated hydrocarbon group, and therefore, in the activation of a secondary battery, an organic and/or inorganic coating film(s) may be uniformly formed on the surface(s) of a positive electrode and/or a negative electrode. According to this, the electrolyte additive can inhibit the generation of gas caused by decomposition of the electrolyte when a battery is exposed to a high temperature, and can improve an increase in resistance and/or a decrease in capacity of the battery, resulting in further improvement in the performance and high-temperature safety of the battery.

To this end, in the compound represented by Formula 1, each $R_1$ is independently a single bond, a methylene group, an ethylene group, a propylene group, or

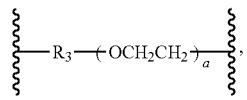

each $R_3$ is independently hydrogen or a methyl group, and a is an integer of 1 to 5.

In one example, the compound represented by Formula 1 may be one or more compounds selected from Structural Formulas 1 to 8 below:

Structural Formula 1

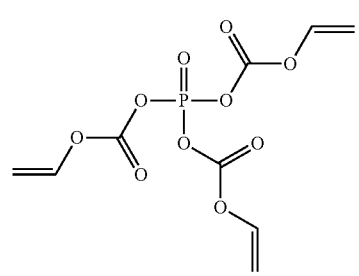

Structural Formula 2

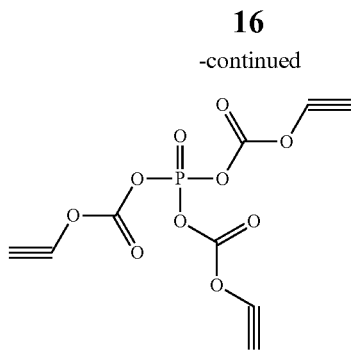

Structural Formula 3

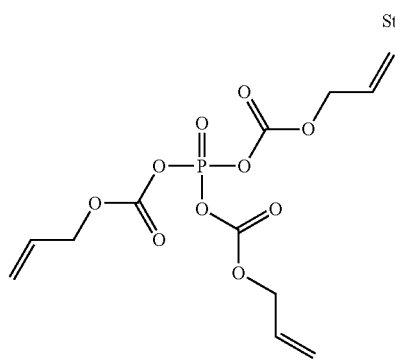

Structural Formula 4

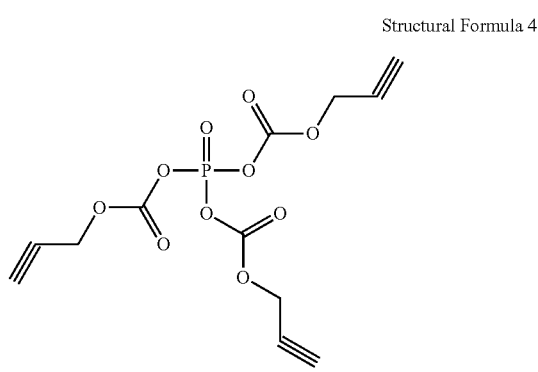

Structural Formula 5

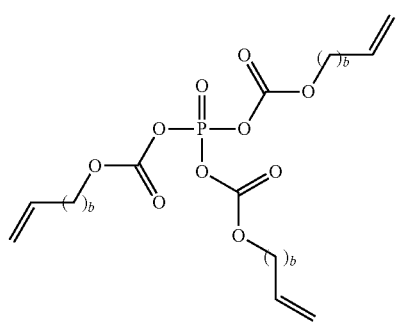

b = respectively 2 or 3

Structural Formula 6

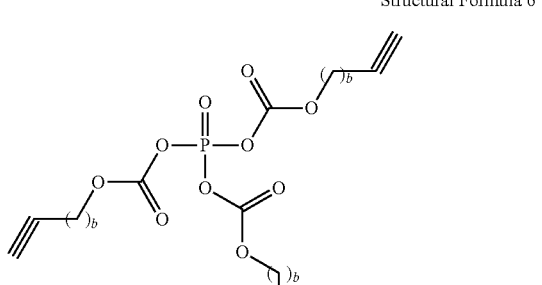

b = respectively 2 or 3

Structural Formula 7

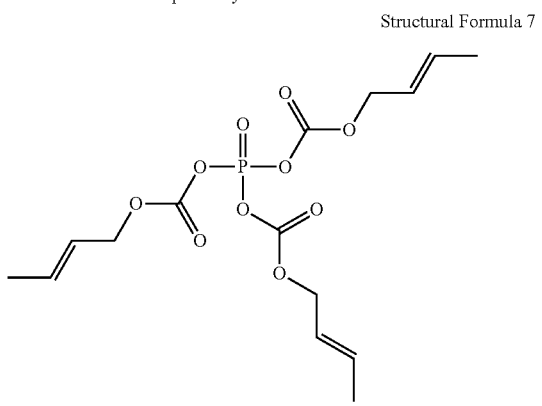

Structural Formula 8

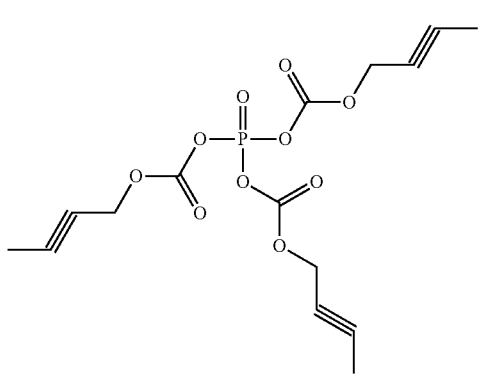

The electrolyte composition may include the above-described additive, thereby reducing gas generated in charging/discharging of a secondary battery, and effectively preventing an increase in cell resistance and a decrease in capacity, which are caused by elution of metal ions from an electrode, resulting in further improvement in performance and high temperature safety of the battery.

In addition, the additive including the compound represented by Formula 1 may be included at a certain content in the electrolyte composition. Specifically, the compound represented by Formula 1 may be present in an amount of 0.01 to 5 wt %, and more specifically, 0.05 to 3 wt %, 1.0 to 2.5 wt %, or 0.5 to 1.5 wt % with respect to the total weight of the electrolyte composition. In the present disclosure, the content of the electrolyte additive is used in excess outside the above range to increase the viscosity of the electrolyte composition, thereby preventing the wettability of an electrode and a separator from being degraded and preventing a decrease in battery performance due to a reduction in ion conductivity of the electrolyte composition. In addition, the present disclosure may prevent the additive effect from being insignificantly implemented when the electrolyte additive is used at a trace amount outside the above range.

Meanwhile, the lithium salt used in the electrolyte composition may be applied without particular limitation as long as it is used in a non-aqueous electrolyte in the art. Specifically, the lithium salt may include one or more selected from the group consisting of LiCl, LiBr, LiI, LiClO$_4$, LiBF$_4$, LiB10Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$Nli, and (FSO$_2$)$_2$NLi.

The concentration of the lithium salt is not particularly limited, and the lower limit of the appropriate concentration range is 0.5 mol/L or more, specifically 0.7 mol/L or more, and more specifically 0.9 mol/L or more, and the upper limit of the appropriate concentration range is 2.5 mol/L or less, specifically 2.0 mol/L or less, and more specifically 1.5 mol/L or less. When the concentration of the lithium salt is lower than 0.5 mol/L, there is a risk that ion conductivity is reduced, and the cycle characteristics and output characteristics of a non-aqueous electrolyte battery are lowered. In addition, when the concentration of the lithium salt exceeds 2.5 mol/L, the viscosity of an electrode for non-aqueous electrolyte battery increases, and thus there is a risk of decreasing ion conductivity and lowering the cycle characteristics and output characteristics of a non-aqueous electrolyte battery.

In addition, when a large amount of lithium salt is dissolved in a non-aqueous organic solvent at one time, the liquid temperature may increase because of the dissolution heat for the lithium salt. As described above, when the temperature of the non-aqueous organic solvent significantly increases due to the dissolution heat for the lithium salt, there is a risk that the decomposition may be accelerated to generate hydrogen fluoride (HF). Hydrogen fluoride (HF) is not preferable because it causes degraded battery performance. Therefore, a temperature at which the lithium salt is dissolved in a non-aqueous organic solvent may be adjusted to −20 to 80° C., and specifically 0 to 60° C., but the present disclosure is not particularly limited thereto.

Furthermore, a non-aqueous organic solvent used in the electrolyte composition may be applied without particular limitation as long as it can be used in a non-aqueous electrolyte in the art. Specifically, examples of the non-aqueous organic solvents may include aprotic organic solvents such as N-methyl-2-pyrrolidinone, ethylene carbonate (EC), propylene carbonate, butylene carbonate, dimethyl carbonate, diethyl carbonate, 7-butyrolactone, 1,2-dimethyoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl citrate, phosphoric acid triester, trimethoxy methane, a dioxolane derivative, sulfolane, methyl sulfolane, 1,3-diethyl-2-imidazolidinone, a propylene carbonate derivative, a tetrahydrofuran derivative, ether, methyl propionate, and ethyl propionate.

In addition, as a non-aqueous solvent used in the present disclosure, one type of the above examples may be used alone, or two or more types thereof may be used by mixing in any combination and ratio according to purpose. In terms of electrochemical stability against the oxidation/reduction of the solvent and chemical stability against heat or the reaction with a solute, among the above examples, particularly, propylene carbonate, ethylene carbonate, fluoroethylene carbonate, diethyl carbonate, dimethyl carbonate, or ethyl methyl carbonate is preferable.

Meanwhile, the electrolyte composition may further include an additive, other than the above-described basic components. Without departing the gist of the present disclosure, an additive generally used in the non-aqueous electrolyte of the present disclosure may be added at any ratio. Specifically, the additive may be a compound having an overcharge prevention effect, a negative electrode coating film-forming effect, and a positive electrode protection effect, such as cyclohexylbenzene, biphenyl, t-butylbenzene, vinylene carbonate, vinylethylene carbonate, difluoroanisole, fluoroethylene carbonate, propane sultone, succinonitrile, or dimethylvinylene carbonate. In addition, in the case of use in a non-aqueous electrolyte battery called a lithium polymer battery, it is also possible to use an electrolyte for non-aqueous electrolyte batteries after being pseudo-solidified by a gelling agent or cross-linked polymer.

Hereinafter, the present disclosure will be described in further detail with reference to examples and an experimental example.

However, the following examples and experimental example merely illustrate the present disclosure, and the content of the present disclosure is not limited to the following examples and experimental example.

Examples 1 to 5 and Comparative Examples 1 to 3. Preparation of Electrolyte Compositions A non-aqueous electrolyte composition was prepared by dissolving 1M LiPF$_6$ as a lithium salt in a solvent in which ethylene carbonate (EC) and ethyl methyl carbonate (EMC) were mixed in a volume ratio of 3:7, and dissolving an additive to have a wt % as shown in Table 1 below with respect to the total weight of the electrolyte.

TABLE 1

| | Additive type | Amount used |
|---|---|---|
| Example 1 | 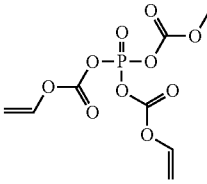 | 0.01 wt % |
| Example 2 | | 1.0 wt % |
| Example 3 | | 10.0 wt % |
| Example 4 | 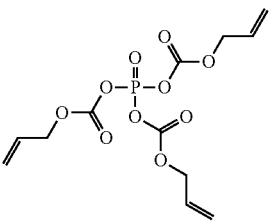 [SMILES: C=CCOC(=O)OP(=O)(OC(=O)OCC=C)OC(=O)OCC=C] | 1.0 wt % |
| Example 5 | 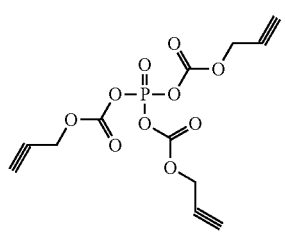 [SMILES: C#CCOC(=O)OP(=O)(OC(=O)OCC#C)OC(=O)OCC#C] | 1.0 wt % |

TABLE 1-continued

| | Additive type | Amount used |
|---|---|---|
| Comparative Example 1 | — | — |
| Comparative Example 2 | 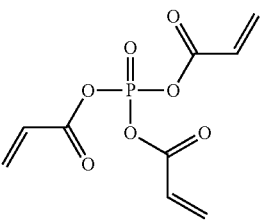 [SMILES: C=CC(=O)OP(=O)(OC(=O)C=C)OC(=O)C=C] | 1.0 wt % |
| Comparative Example 3 | 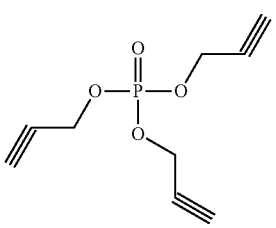 | 1.0 wt % |

Examples 6 to 10 and Comparative Examples 4 to 6. Manufacture of Lithium Secondary Batteries A positive electrode was manufactured by preparing LiNi$_{0.8}$Co$_{0.1}$Mn$_{0.05}$Al$_{0.05}$O$_4$ having a particle size of 5 m as a positive electrode active material, preparing a slurry by mixing the positive electrode active material with a carbon-based conductive material and polyvinylidene fluoride as a binder in a weight ratio of 94:3:3 in N-methyl pyrrolidone (NMP), casting the slurry on an aluminum thin film, drying the slurry in a vacuum oven at 120° C., and rolling the resultant. Separately, a negative electrode was manufactured by preparing artificial graphite as a negative electrode active material, forming a slurry by mixing 97 parts by weight of the negative electrode active material and 3 parts by weight of styrene butadiene rubber (SBR) with water, casting the slurry on a copper thin film, drying the slurry in a vacuum oven at 130° C., and rolling the resultant.

A 2.1-Ah small pouch-type lithium secondary battery was manufactured by interposing a separator consisting of 18-μm polypropylene between the positive electrode and negative electrode obtained above, inserting the resultant into a case, and injecting the electrolyte composition (5 ml) prepared in each of Examples 1 to 5 and Comparative Examples 1 to 3 as shown in Table 2 below.

TABLE 2

| | Type of electrolyte composition |
|---|---|
| Example 6 | Electrolyte composition of Example 1 |
| Example 7 | Electrolyte composition of Example 2 |
| Example 8 | Electrolyte composition of Example 3 |
| Example 9 | Electrolyte composition of Example 4 |
| Example 10 | Electrolyte composition of Example 5 |
| Comparative Example 4 | Electrolyte composition of Comparative Example 1 |
| Comparative Example 5 | Electrolyte composition of Comparative Example 2 |
| Comparative Example 6 | Electrolyte composition of Comparative Example 3 |

Experimental Example

To evaluate the performance of the lithium secondary battery according to the present disclosure, the following experiments were performed.

Analysis of Change in Resistance and Capacity of Secondary Battery after High Temperature Storage While each of the secondary batteries produced in Examples and Comparative Examples was stored at 60° C. for 12 weeks, the change in resistance and capacity of the battery was observed.

Specifically, the activation charge/discharge of each secondary battery was performed twice at 0.2C/0.5C, and then a charging/discharging experiment was performed once with a standard charge/discharge current density of 0.5C/0.2C, a final charging voltage of 4.8V (Li/graphite), and a final discharging voltage of 3.0V (Li/graphite).

Afterward, the resistance and capacity of the battery were measured at intervals of 2 weeks while the battery was fully charged at 4.2V of 0.33C and stored at a high temperature of 60° C. Here, after measuring the resistance and capacity of the battery, the battery was fully charged and stored. The amount of change based on the initial resistance and initial capacity of the battery was calculated from the measured resistance and capacity of the battery, and the results are shown in Table 3 below.

Analysis of Amount of Gas Generation of Secondary Battery Stored at High Temperature While each of the secondary batteries produced in Examples and Comparative Examples was stored at 60° C. for 12 weeks, the amount of gas generated from the battery was analyzed at intervals of 2 weeks. Specifically, the activation charge/discharge of each secondary battery was performed twice at 0.2C/0.5C, and then a charging/discharging experiment was performed once with a standard charge/discharge current density of 0.5C/0.2C, a final charging voltage of 4.8V (Li/graphite), and a final discharging voltage of 3.0V (Li/graphite).

Afterward, the battery was fully charged with 4.2V of 0.33C, and stored at a high temperature of 60° C. for 12 weeks. After 12 weeks, the surface of the secondary battery was pressed to degas, and the amount of the degassed gas was measured. The result is shown in Table 3 below.

TABLE 3

|  | Amount of gas generated [μl] | Resistance increase rate [%] | Capacity retention rate [%] |
|---|---|---|---|
| Example 6 | 1680 | 5.79 | 96.3 |
| Example 7 | 1420 | −0.43 | 97.3 |
| Example 8 | 1532 | −0.39 | 96.6 |
| Example 9 | 1411 | −0.53 | 97.8 |
| Example 10 | 1405 | −1.85 | 97.9 |
| Comparative Example 4 | 1730 | 8.89 | 95.3 |
| Comparative Example 5 | 1516 | 7.12 | 94.7 |
| Comparative Example 6 | 1587 | 6.05 | 95.9 |

As shown in Table 3, it was confirmed that the secondary batteries of Examples include an electrolyte composition containing an additive including a compound represented by Formula 1, thereby realizing the high electrical performance of the batteries under a high temperature condition, and reducing an amount of gas generated.

Specifically, compared with the secondary batteries of Comparative Examples, it was shown that the secondary batteries of Examples have a significantly less amount of gas, a small increase in resistance of the battery, and a high capacity retention rate although exposed to a high temperature condition.

From the above results, as the secondary battery according to the present disclosure uses an additive of a specific component in a non-aqueous electrolyte, along with a positive electrode active material including a high concentration(s) of nickel and/or manganese, thereby uniformly forming a coating film on an electrode surface in the activation of a battery, it is possible to prevent the generation of a large amount of gas under a high temperature condition and effectively prevent an increase in cell resistance and a decrease in capacity when metal ions are eluted from the electrode, resulting in effective improvement in performance and high-temperature safety of the battery.

As above, the present disclosure has been described with reference to exemplary embodiments, but it should be understood by those killed in the art or those of ordinary skill in the art that the present disclosure can be variously modified and changed without departing from the spirit and technical scope of the present disclosure described in the accompanying claims.

Accordingly, the technical scope of the present disclosure is not limited to the content described in the detailed description of the specification, but should be defined by the claims.

The invention claimed is:

1. An electrolyte composition, comprising:
a non-aqueous organic solvent;
a lithium salt; and
an additive comprising a compound represented by Formula 1:

[Formula 1]

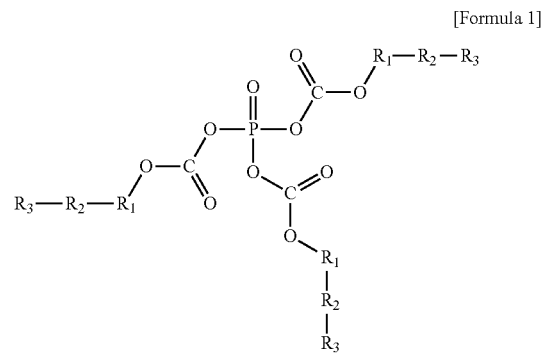

wherein,
each $R_1$ is independently a single bond, an alkylene group having 1 to 10 carbon atoms, or

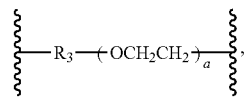

each $R_2$ is independently a double or triple bond including 2 carbon atoms,
each $R_3$ is independently hydrogen or an alkyl group having 1 to 4 carbon atoms, and
a is an integer of 1 to 10.

2. The composition of claim 1, wherein each $R_1$ is independently a single bond, a methylene group, an ethylene group, a propylene group, or

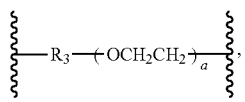

each R₃ is e independently hydrogen or a methyl group, and a is an integer of 1 to 5.

3. The composition of claim 1, wherein the compound represented by Formula 1 comprises one or more compounds of Structural Formulas 1 to 8 below:

Structural Formula 1

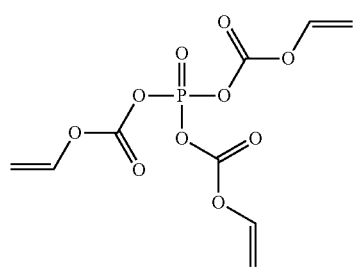

Structural Formula 2

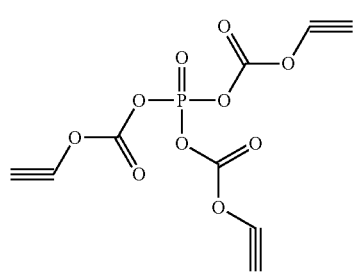

Structural Formula 3

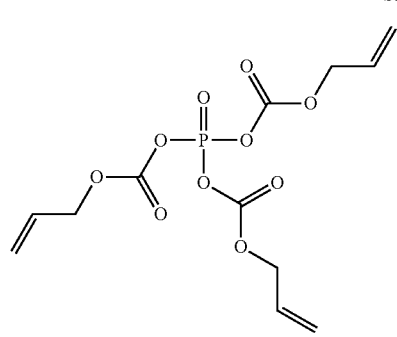

Structural Formula 4

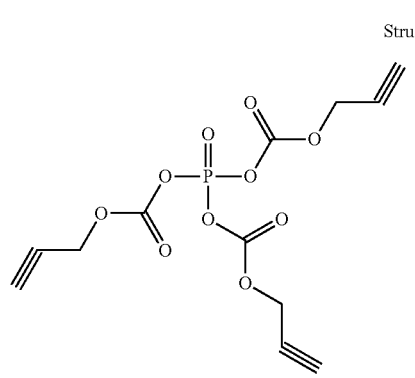

Structural Formula 5

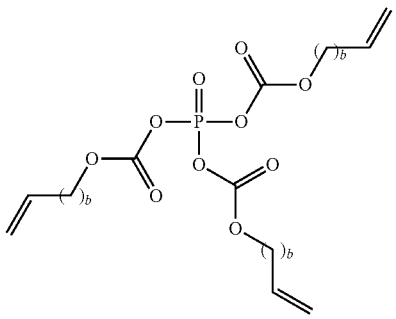

b = respectively 2 or 3

Structural Formula 6

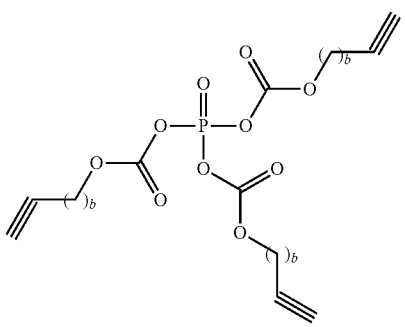

b = respectively 2 or 3

Structural Formula 7

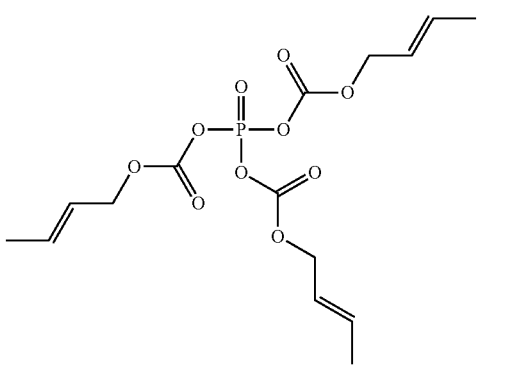

Structural Formula 8

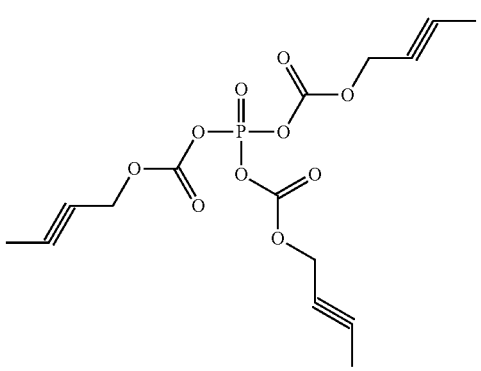

4. The composition of claim 1, wherein the additive is present in an amount of 0.01 to 5 wt % with respect to the total weight of the electrolyte composition.

5. The composition of claim 1, wherein the lithium salt comprises one or more selected from the group consisting of LiCl, LiBr, LiI, LiClO$_4$, LiBF$_4$, LiB10Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, and (FSO$_2$)$_2$NLi.

6. The composition of claim 1, wherein the non-aqueous organic solvent comprises one or more selected from the group consisting of N-methyl-2-pyrrolidinone, ethylene carbonate, propylene carbonate, butylene carbonate, dimethyl carbonate, diethyl carbonate, 7-butyrolactone, 1,2-dimethyoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl citrate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

7. A lithium secondary battery, comprising:
an electrolyte assembly comprising a positive electrode, a negative electrode, and a separator interposed between the positive electrode and the negative electrode; and
an electrolyte composition comprising a non-aqueous organic solvent, a lithium salt, and an additive comprising a compound represented by Formula 1:

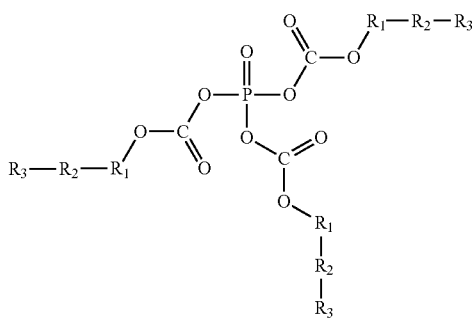

[Formula 1]

wherein,
each R$_1$ is independently a single bond, an alkylene group having 1 to 10 carbon atoms, or

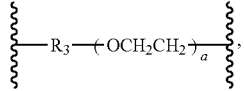

each R$_2$ is independently a double or triple bond including 2 carbon atoms,
each R$_3$ is independently hydrogen or an alkyl group having 1 to 4 carbon atoms, and
a is an integer of 1 to 10.

8. The battery of claim 7, wherein the positive electrode comprises:
a positive electrode current collector; and
a positive electrode mixture layer which is formed on the positive electrode current collector,
wherein the positive electrode mixture layer comprises a lithium metal oxide represented by Formula 2, a lithium metal oxide represented by Formula 3, or a combination thereof:

$$Li_x[Ni_yCo_zMn_wM^1_v]O_2 \quad \text{[Formula 2]}$$

$$LiM^2_pMn_{(2-p)}O_4 \quad \text{[Formula 3]}$$

In Formulas 2 and 3,
M$^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo,
x, y, z, w and v are respectively 1.0≤x≤1.30, 0.5≤y<1, 0<z≤0.3, 0<w≤0.3, and 0≤v≤0.1, wherein y+z+w+v=1,
M$^2$ is Ni, Co or Fe, and
p is 0.05≤p≤0.6.

9. The battery of claim 8, wherein the lithium metal oxide comprises one or more selected from the group consisting of LiNi$_{0.8}$Co$_{0.1}$Mn$_{0.1}$O$_2$, LiNi$_{0.6}$Co$_{0.2}$Mn$_{0.2}$O$_2$, LiNi$_{0.9}$Co$_{0.05}$Mn$_{0.05}$O$_2$, LiNi$_{0.6}$Co$_{0.2}$Mn$_{0.1}$Al0.1O$_2$, LiNi$_{0.6}$Co$_{0.2}$Mn$_{0.15}$Al$_{0.05}$O$_2$, LiNi$_{0.7}$Co$_{0.1}$Mn$_{0.1}$Al$_{0.1}$O$_2$, LiNi$_{0.7}$Mn$_{1.3}$O$_4$, LiNi$_{0.5}$Mn$_{1.5}$O$_4$, and LiNi$_{0.3}$Mn$_{1.7}$O$_4$.

10. The battery of claim 7, wherein the negative electrode comprises:
a negative electrode current collector; and
a mixture layer which is formed on the negative electrode current collector,
wherein the mixture layer comprises a negative electrode active material, and
wherein the negative electrode active material comprises one or more carbon materials selected from the group consisting of natural graphite, artificial graphite, expanded graphite, non-graphitizing carbon, carbon black, acetylene black, and Ketjen black.

11. The battery of claim 10, wherein the negative electrode active material further comprises one or more silicon materials selected from the group consisting of silicon (Si), silicon carbide (SiC) and silicon oxide (SiOq, 0.8≤q≤2.5).

12. The battery of claim 11, wherein the silicon material is present in an amount of 1 to 20 wt % with respect to the total weight of the negative electrode active material.

* * * * *